US009351186B2

(12) United States Patent
Devarasetty et al.

(10) Patent No.: US 9,351,186 B2
(45) Date of Patent: May 24, 2016

(54) METHODS, SYSTEMS, AND COMPUTER READABLE MEDIA FOR FREQUENCY SELECTIVE CHANNEL MODELING

(71) Applicant: Ixia, Calabasas, CA (US)

(72) Inventors: Prasada Rao Devarasetty, Cary, NC (US); Kalyan Sundhar, Cary, NC (US); Roger Alan Slyk, Raleigh, NC (US)

(73) Assignee: Ixia, Calabasas, CA (US)

( * ) Notice: Subject to any disclaimer, the term of this patent is extended or adjusted under 35 U.S.C. 154(b) by 54 days.

(21) Appl. No.: 14/280,319

(22) Filed: May 16, 2014

(65) Prior Publication Data

US 2014/0341052 A1 Nov. 20, 2014

Related U.S. Application Data

(60) Provisional application No. 61/824,226, filed on May 16, 2013.

(51) Int. Cl.
*H04B 17/00* (2015.01)
*H04L 5/00* (2006.01)
*H04W 24/08* (2009.01)

(52) U.S. Cl.
CPC .......... *H04W 24/08* (2013.01); *H04B 17/0087* (2013.01); *H04L 5/003* (2013.01)

(58) Field of Classification Search
CPC ... H04B 17/00; H04B 17/0087; H04W 24/08; H04L 5/003
See application file for complete search history.

(56) References Cited

U.S. PATENT DOCUMENTS 5,530,917 A 6/1996 Andersson et al.
5,539,749 A 7/1996 Eul
(Continued)

FOREIGN PATENT DOCUMENTS

JP 2009-065488 A 3/2009
WO WO 02/098151 A1 12/2002
(Continued)

OTHER PUBLICATIONS

Commonly-assigned, co-pending International Application No. PCT/US14/35204 for "Methods, Systems, and Computer Readable Media for Testing Inter-Cell Interference Coordination Capabilities of Wireless Access Nodes," (Unpublished, filed Apr. 23, 2014).
(Continued)

*Primary Examiner* — Brian D Nguyen
(74) *Attorney, Agent, or Firm* — Jenkins, Wilson, Taylor & Hunt, P.A.

(57) ABSTRACT

The subject matter described herein includes methods, systems, and computer readable media for frequency selective channel modeling. One exemplary system includes a network equipment test device including at least one processor. The network equipment test device includes the UE emulator implemented by the at least one processor and configured to emulate a plurality of UEs that attach to and communicate with a device under test. The system further includes a frequency selective channel modeler configured to receive resource scheduling information for the UEs from the device under test, to determine channel performance categories for the UEs using the resource scheduling information and to determine values for channel quality parameters using the channel performance categories assigned to the resource blocks, which represent selected frequencies in the total channel bandwidth. The emulated UEs communicate the channel quality parameters to the device under test based on the frequency allocated for a given UE in the channel bandwidth.

23 Claims, 4 Drawing Sheets

(56) References Cited

U.S. PATENT DOCUMENTS

| | | | |
|---|---|---|---|
| 5,561,841 A | 10/1996 | Markus | |
| 5,596,570 A | 1/1997 | Soliman | |
| 5,867,791 A | 2/1999 | Chambert | |
| 6,018,521 A | 1/2000 | Timbs et al. | |
| 6,163,547 A | 12/2000 | De Vriendt et al. | |
| 6,292,667 B1 | 9/2001 | Wallentin et al. | |
| 6,308,065 B1 | 10/2001 | Molinari et al. | |
| 6,374,112 B1* | 4/2002 | Widegren | H04W 28/18 370/352 |
| 6,445,683 B1 | 9/2002 | Nobuyasu et al. | |
| 6,456,675 B2 | 9/2002 | Wagner et al. | |
| 6,466,556 B1 | 10/2002 | Boudreaux | |
| 6,490,315 B2 | 12/2002 | Katz et al. | |
| 6,519,461 B1 | 2/2003 | Andersson et al. | |
| 6,587,457 B1 | 7/2003 | Mikkonen | |
| 6,594,240 B1 | 7/2003 | Chuah et al. | |
| 6,594,241 B1 | 7/2003 | Malmlöf | |
| 6,771,957 B2 | 8/2004 | Chitrapu | |
| 7,558,565 B2 | 7/2009 | Miller et al. | |
| 7,889,663 B1 | 2/2011 | Wright et al. | |
| 8,781,797 B1* | 7/2014 | Oltman | G06F 11/261 455/115.1 |
| 8,793,117 B1 | 7/2014 | Varshney et al. | |
| 9,125,068 B2 | 9/2015 | Balkwill | |
| 2002/0012380 A1 | 1/2002 | Hottinen et al. | |
| 2002/0021698 A1 | 2/2002 | Lee et al. | |
| 2002/0183053 A1 | 12/2002 | Gopalakrishna et al. | |
| 2004/0214564 A1 | 10/2004 | Rosen et al. | |
| 2006/0229018 A1 | 10/2006 | Mlinarsky et al. | |
| 2006/0234636 A1 | 10/2006 | Miller et al. | |
| 2006/0262880 A1 | 11/2006 | Mizuta et al. | |
| 2006/0276195 A1 | 12/2006 | Nordling | |
| 2009/0046569 A1* | 2/2009 | Chen | H04L 1/0029 370/203 |
| 2009/0109926 A1 | 4/2009 | Meylan | |
| 2010/0075678 A1 | 3/2010 | Akman et al. | |
| 2011/0199985 A1 | 8/2011 | Cai et al. | |
| 2011/0223900 A1 | 9/2011 | Yu et al. | |
| 2011/0287721 A1* | 11/2011 | Haran | H04B 17/391 455/67.11 |
| 2011/0294497 A1 | 12/2011 | Hedlund et al. | |
| 2011/0310745 A1 | 12/2011 | Goria et al. | |
| 2012/0150521 A1 | 6/2012 | Balkwill | |
| 2012/0269143 A1* | 10/2012 | Bertrand | H04W 72/1231 370/329 |
| 2012/0309323 A1 | 12/2012 | Guo et al. | |
| 2013/0044610 A1* | 2/2013 | Zhao | H04B 7/0417 370/252 |
| 2013/0155872 A1* | 6/2013 | Subramanian | H04W 24/06 370/242 |
| 2013/0155878 A1* | 6/2013 | Deng | H04L 1/1887 370/252 |
| 2013/0235727 A1* | 9/2013 | Campbell | H04L 43/50 370/236 |
| 2014/0321303 A1 | 10/2014 | Iyer et al. | |

FOREIGN PATENT DOCUMENTS

| | | |
|---|---|---|
| WO | WO 2012/117147 A1 | 9/2012 |
| WO | WO 2012/150894 A1 | 11/2012 |
| WO | WO 2014/176376 A1 | 10/2014 |

OTHER PUBLICATIONS

Commonly-assigned, co-pending U.S. Appl. No. 14/229,789 for "Methods, Systems, and Computer Readble Media for Testing Inter-Cell Interference Coordination Capabilities for Wireless Access Nodes," (Unpublished, filed Mar. 28, 2014).

"LTE and LTE-A Products," Part No. 46891/580, Issue 3, pp. 1-16 (Jan. 2013).

"Infrastructure Test System, TM500 LTE-A, 3GPP LTE Test," Part No. 46900/003, Issue 1, pp. 1-8 (Oct. 2012).

"Aeroflex Launches TM500 LTE-A Test Mobile," http://www.evaluationengineering.com/news/aeroflex-launches-tm500-lte-a-test-mobile.php, p. 1 (Jul. 19, 2012).

Notification of Transmittal of the International Search Report and the Written Opinion of the International Searching Authority for International Application No. PCT/US2014/038462 (Sep. 24, 2014).

Non-Final Office Action for U.S. Appl. No. 13/154,166 (Oct. 28, 2014).

Notification of Transmittal of the International Search Report and the Written Opinion of the International Searching Authority, or the Declaration for International Application No. PCT/US2014/035204 (Aug. 22, 2014).

Notice of Allowance and Fee(s) Due for U.S. Appl. No. 13/154,166 (Jun. 2, 2014).

Applicant-Initiated Interview Summary for U.S. Appl. No. 13/154,166 (Apr. 28, 2014).

Final Office Action for U.S. Appl. No. 13/154,166 (Mar. 3, 2014).

Overview of 3GPP Release 10 V0.2.0 (Mar. 2014).

Non-Final Office Action for U.S. Appl. No. 13/154,166 (Aug. 19, 2013).

Dahlman et al., "10.4.9: Blind Decoding of PDCCHs," 4G LTE / LTE-Advanced for Mobile Broadband, pp. 199-202 (2011).

Ikuno et al., "System level simulation of LTE networks," 2010 IEEE 71st Vehicular Technology Conference: VTC2010-Spring, (May 16-19, 2010).

"IxCatapult Chassis," http://www.ixiacom.com/products/display?skey=ch_ixcatapult, pp. 1-2 (Downloaded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-16 (Jan. 2010).

Xiao et al., "IMS Network Deployment Cost Optimization Based on Flow-Based Traffic Model," IEEE/IFIP Network Operations and Management Symposium—NOMS 2010, pp. 232-239 (2010).

"DCT2000 LTE UE Simulation API Manual," Release 17.1, Catapult Communications, pp. 1-106 (May 2009).

"Catapult Communications Announces High-Capacity LTE UE Simulation Test System," Catapult Communications Corporation, pp. 1-2 (Feb. 9, 2009).

"Network Topology," http://web.archive.org/web/20081219235147/http://en.wikipedia.org/wiki/Network_topology, pp. 1-9 (Dec. 19, 2008).

"LTE (Long Term Evolution) Testing Systems," http://www.catapult.com/technologies/tech_lte.htm, pp. 1-2 (Jun. 26, 2008).

Non-Final Office Action for U.S. Appl. No. 09/866,955 (Dec. 31, 2013).

Notification of Transmittal of the International Search Report or the Declaration for International Application No. PCT/US20/16638 (Oct. 29, 2002).

"Universal Mobile Telecommunications (UMTS) Protocols and Protocol Testing," International Engineering Consortium, http://www.iec.org/online/tutorials/UMTS/topic04.html, pp. 1-3 (2001).

"Universal Mobile Telecommunications System (UMTS) Protocols and Protocol Testing," International Engineering Consortium, http://www.iec.org/online/tutorials/UMTS/topic02.html, pp. 1-7 (2001).

"Universal Mobile Telecommunications Systems (UMTS); UTRAN Iub Interface User Plane Protocols for Common Transport Channel Data Streams (3GPP TS 25.435 version 3.5.0 Release 1999)," ETSI TS 125 435 V3.5.0 (Dec. 2000).

"Universal Mobile Telecommunications System (UMTS); UTRAN Iub Interface Data Transport and Transport Signalling for Common Transport Channel Data Streams (3GPP TS 25.434 version 3.4.0 Release 1999)," ETSI TS 125 434 V3.4.0 (Dec. 2000).

"Universal Mobile Telecommunications System (UMTS); UTRAN Iub Interface NBAP Signalling (3GPP TS 25.433 version 3.4.1 Release 1999)," ETSI TS 125 433 V3.4.1 (Dec. 2000).

"Universal Mobile Telecommunications System (UMTS); UTRAN Iub/Iur Interface User Plane Protocol for DCH Data Streams (3GPP TS 25.427 version 3.5.0 Release 1999)," ETSI TS 125 427 V3.5.0 (Dec. 2000).

(56) References Cited

OTHER PUBLICATIONS

"Universal Mobile Telecommunications System (UMTS); UTRAN Iur and Iub Interface Data Transport; Transport Signalling for DCH Data Streams (3GPP TS 25.426 version 3.5.0 Release 1999)," ETSI TS 125 426 V3.5.0 (Dec. 2000).
"Universal Mobile Telecommunications System (UMTS); UTRAN Overall Description (3GPP TS 25.401 version 3.5.0 Release 1999)," ETSI TS 125 401 V3.5.0 (Dec. 2000).
"Universal Mobile Telecommunications System (UMTS); RRC Protocol Specification (3GPP TS 25.331 version 3.5.0 Release 1999)," ETSI TS 125 331 V3.5.0 (Dec. 2000).
"Universal Mobile Telecommunications System (UMTS); RLC protocol specification (3GPP TS 25.322 version 3.5.0 Release 1999)," ETSI TS 125 322 V3.5.0 (Dec. 2000).
"Universal Mobile Telecommunications System (UMTS); MAC protocol specification (3GPP TS 25.321 version 3.5.0 Release 1999)," ETSI TS 125 321 V3.6.0 (Dec. 2000).
Kwon et al., "Performance Comparison of RAN-CN Protocol Stacks in IMT-2000 Networks," IEEE, pp. 2370-2374 (2000).
Weiss, "Designing Macroscopic Diversity Cellular Systems," IEEE, pp. 2054-2058 (1999).
Lee et al., "Effect of Soft and Softer Handoffs on CDMA System Capacity," IEEE Transactions on Vehicular Technology, vol. 47, No. 3, pp. 830-841 (Aug. 1998).
Marchent et al., "Handover and Macro Diversity for 3rd Generation Mobile Systems within ATM Fixed Networks," IEEE, pp. 1151-1155 (1996).
Non-Final Office Action for U.S. Appl. No. 14/229,789 (Sep. 15, 2015).
Supplemental Notice of Allowability for U.S. Appl. No. 13/154,166 (Jul. 28, 2015).
Corrected Notice of Allowability for U.S. Appl. No. 13/154,166 (Apr. 24, 2015).
Notice of Allowance and Fee(s) Due for U.S. Appl. No. 13/154,166 (Apr. 13, 2015).

* cited by examiner

METHODS, SYSTEMS, AND COMPUTER READABLE MEDIA FOR FREQUENCY SELECTIVE CHANNEL MODELING

PRIORITY CLAIM

This application claims the benefit of U.S. Provisional Patent Application Ser. No. 61/824,226, filed May 16, 2013; the disclosure of which is incorporated herein by reference in its entirety.

TECHNICAL FIELD

The subject matter described herein relates to testing radio network equipment. More particularly, the subject matter described herein described herein includes methods, systems, and computer readable media for frequency selective channel modeling.

BACKGROUND

When testing radio network equipment, such as evolved Node Bs (e-Node Bs), it is desirable to simulate cell coverage holes on a frequency specific basis. For example, an e-Node B schedules user equipment (UEs) to specific frequencies and timeslots for transmission of data on uplink channels to the e-Node Bs. Similarly, the e-Node B schedules or assigns particular downlink frequencies and timeslots to UEs for transmission of data on downlink channels to the UEs. If a particular set of frequencies and timeslots is performing poorly, the e-Node B may migrate the scheduling such that UEs are scheduled to frequency bands and timeslots that are performing better. Similarly, if a particular set of frequencies and timeslots is performing well, the e-Node B may migrate UE assignment towards such frequencies and timeslots. It is desirable to simulate poor and good channel characteristics to trigger a response by the e-Node B so that the response can be monitored to ensure that the e-Node B will perform correctly when deployed in a live network.

One possible method for testing an e-Node B's response to varying channel conditions is to simulate channel quality changes on a per UE basis. For example, a simulated UE may fake poor channel quality by changing channel quality parameters, such as channel quality indicator (CQI), block error rate (BLER), or other parameters, and communicate these false channel quality parameters to the e-Node B. However, simulating such parameters on a per UE basis does not take into account how the UEs are scheduled by the e-Node B across the bandwidth. In addition, modeling changes in channel quality on a per UE basis may be cumbersome in cases when hundreds or even thousands of UEs are being simulated and the channel conditions will follow UE not the frequency allocation in the bandwidth.

Accordingly, in light of these difficulties and limitations, there exists a need for methods, systems, and computer readable media for frequency selective channel modeling.

SUMMARY

The subject matter described herein includes methods, systems, and computer readable media for frequency selective channel modeling. One exemplary system includes a network equipment test device including at least one processor. The network equipment test device includes the UE emulator implemented by the at least one processor and configured to emulate a plurality of UEs that attach to and communicate with a device under test. The system further includes a frequency selective channel modeler configured to receive resource scheduling information for the UEs from the device under test, to determine channel performance categories for the UEs across the bandwidth using the resource scheduling information and to determine values for channel quality parameters using the channel performance categories. The emulated UEs communicate the channel quality parameters to the device under test.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
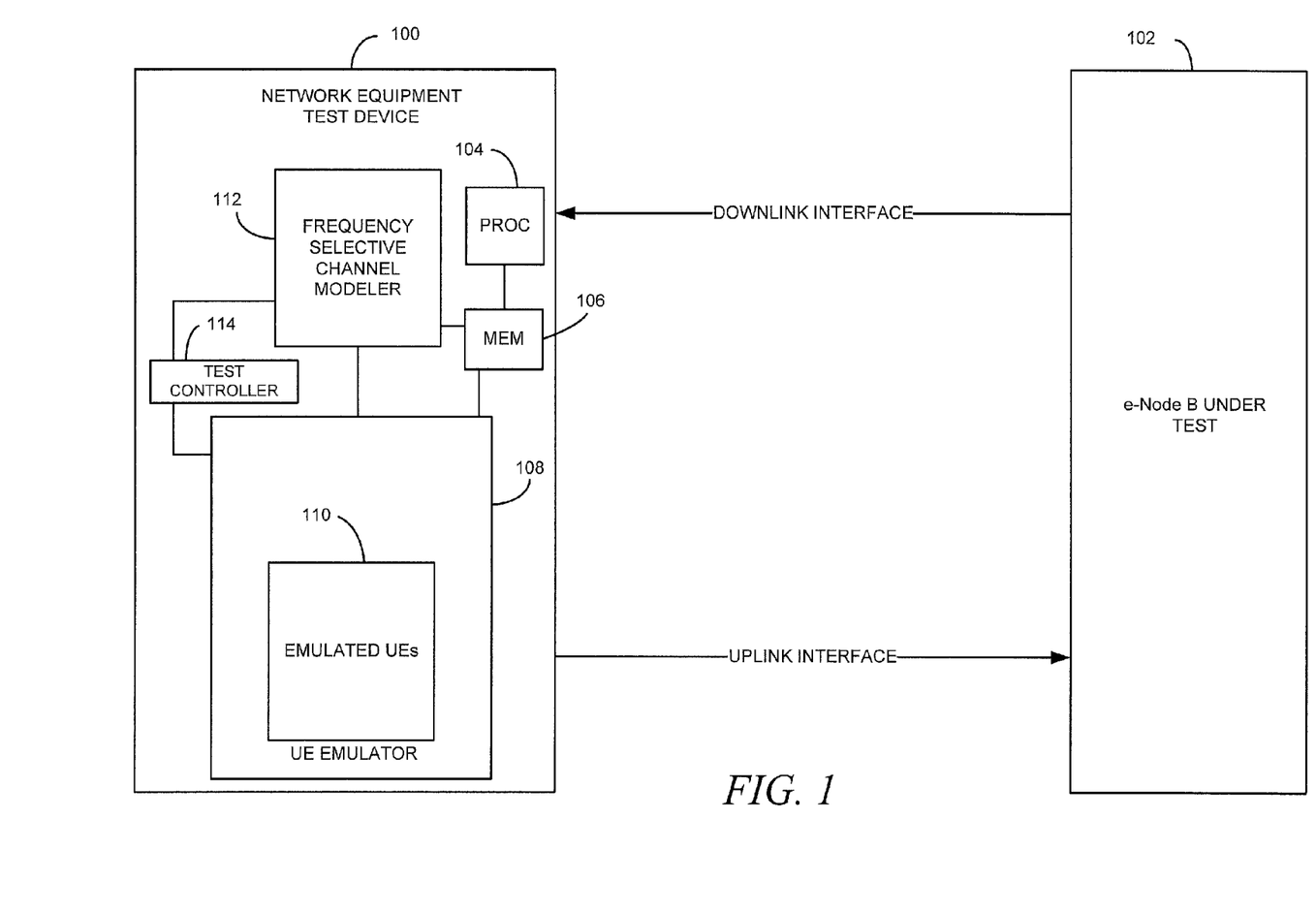
FIG. 1 is a block diagram illustrating a system for frequency selective channel modeling according to an embodiment of the subject matter described herein.

The subject matter described herein includes methods, systems, and computer readable media for frequency selective channel modeling. Referring to FIG. 1, a network equipment test device 100 is configured to test the functionality of the device under test 102. Device under test 102 may be an e-Node B, a Node B, or any other radio interface node that communicates directly with UEs. Network equipment test device 100 includes at least one processor 104 and associated memory 106. Network equipment test device 100 further includes an UE emulator 108 that emulates UEs 110 that attach to and communicate with device under test 102.

Figure 2:
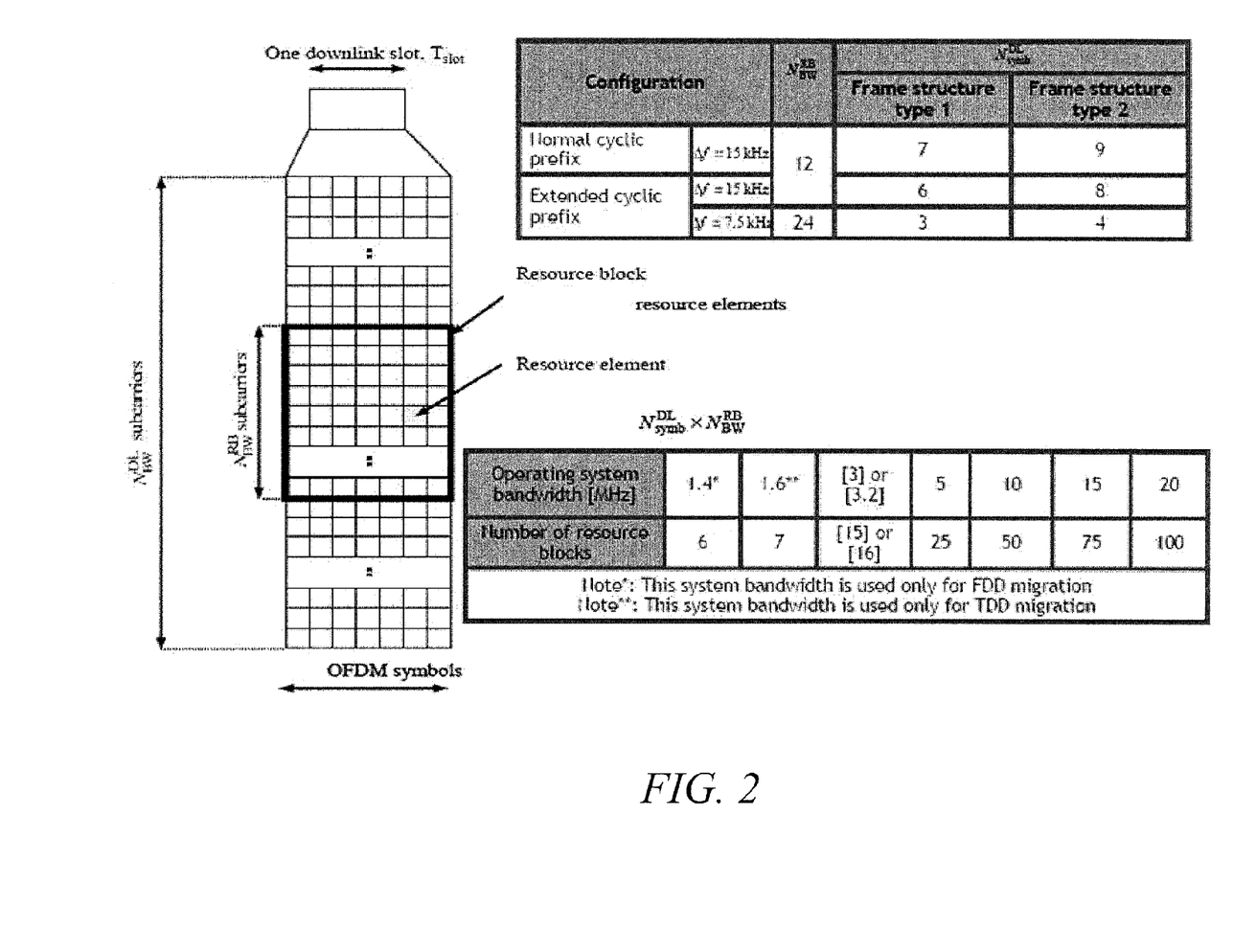
FIG. 2 is a diagram illustrating a grid used to define resource allocation for downlink communications in a long term evolution (LTE) network.

In order to perform frequency selective channel modeling, network equipment test device 100 includes a frequency selective channel modeler 112 that models channel parameters on a per resource block basis, rather than a per UE basis and provides information to UE emulator 108 so that UE emulator 108 can adjust channel parameters of emulated UEs. In LTE and LTE advanced networks, the e-Node B assigns or schedules UEs to resource blocks for uplink and downlink communications. FIG. 2 is a grid illustrating downlink resource blocks and resource elements in an LTE or LTE advanced network. In FIG. 2, each column of cells corresponds to an orthogonal frequency division multiplexing (OFDM) symbol. Each row corresponds to a different subcarrier or frequency. Each cell or element in the grid is referred to as a resource element, which consists of one subcarrier during one OFDM symbol. A resource block is a collection of 12 consecutive subcarriers in the frequency domain and a 1.5 millisecond timeslot in the time domain. Each resource block thus consists of 7×12=84 resource elements in the case of a normal cyclic prefix and 6×12=72 resource elements in the case of an extended resource element. Although FIG. 2 illustrates downlink resource blocks and downlink resource elements, it is understood that a similar structure may be used for uplink communications.

Each resource block will be assigned to one or more UEs at attachment time by the e-Node B. It is desirable to test the scheduling functionality of the e-Node B in response to frequency selective channel modeling. Accordingly, frequency selective channel modeler 112 may place resource blocks in performance categories that are mapped to channel quality parameters. Table 1 shown below illustrates an exemplary mapping that may be used by frequency selective channel modeler 112 to assign resource blocks to performance categories.

TABLE 1

RESOURCE BLOCK TO PERFORMANCE CATEGORY MAPPINGS

| RB# (Ex: 5 MHz BW) | Performance Category |
|---|---|
| 0 | Poor |
| 1 | Poor |
| 2 | Poor |
| 3 | Medium |
| 4 | Medium |
| 5 | Medium |
| 6 | Good |
| 7 | Good |
| 8 | Medium |
| 9 | Medium |
| 10 | Good |
| 11 | Good |
| 12 | Good |
| 13 | Good |
| 14 | Good |
| 15 | Good |
| 16 | Good |
| 17 | Poor |
| 18 | Poor |
| 19 | Poor |
| 20 | Medium |
| 21 | Medium |
| 22 | Medium |
| 23 | Medium |
| 24 | Medium |

In Table 1, resource blocks 1-24 are each assigned a performance category of good, medium, or poor, which correspond to different channel quality parameters. The terms "good", "medium", and "poor" are used herein to indicate relative levels of channel performance. For example, a resource block assigned to a good channel performance category performs better than a resource block assigned to a medium channel performance category, which performs better than a resource block assigned to a poor channel performance category. The channel performance categories are used to determine values for channel quality parameters to be communicated by emulated UEs to the device under test in order to emulate the indicated channel performance. Although the terms "good", "poor", and "medium" are used herein to indicate the channel performance categories, these terms are intended to include or cover any value, word, or construct that can be used to determine channel quality parameters used to emulate a channel performance category. Table 2 shown below illustrates exemplary mappings between resource block performance categories and channel quality parameters.

TABLE 2

CHANNEL PERFORMANCE CATEGORY TO CHANNEL QUALITY PARAMETER MAPPINGS

| Performance Category | Channel Quality Parameters |
|---|---|
| Poor | low CQI value, low UL power, DL BLER is high |
| Medium | medium CQI value, medium UL power, medium DL BLER |
| Good | good CQI value, good UL power, zero or low DL BLER |

In Table 2, each performance category from Table 1 corresponds to channel quality parameter values. For example, if the resource block is in the poor category, this means that the channel has low quality for this resource block, which corresponds to a low CQI value, low uplink power, and high downlink (DL) BLER. Similarly, if the channel quality is intermediate, this may correspond to an intermediate CQI value, a medium uplink power, and a medium DL BLER value. If the channel quality is categorized as good, this may correspond to a good or high CQI value, a good or high uplink power, and zero or low DL BLER. In Table 2, the qualifiers "low", "medium", and "high", refer to relative values of the corresponding parameters. For example, a low CQI value is less than a medium CQI value, which is less than a good or high CQI value. It is understood that in an implementation, actual channel quality parameter values may be specified for each channel performance category.

The channel performance categories and/or channel quality parameters may be used to set or adjust the channel quality parameters for UEs being emulated. For example, for a given UE being emulated, frequency selective channel modeler 110 may determine the resource block or resource blocks to which the UE is assigned, determine the corresponding performance category, and set or adjust the channel quality parameters in accordance with the resource block performance category. UE emulator 108 may then communicate the channel quality parameters to the e-Node B in messages transmitted by emulated UEs 110 to the e-Node B over the uplink interface.

Figure 3:
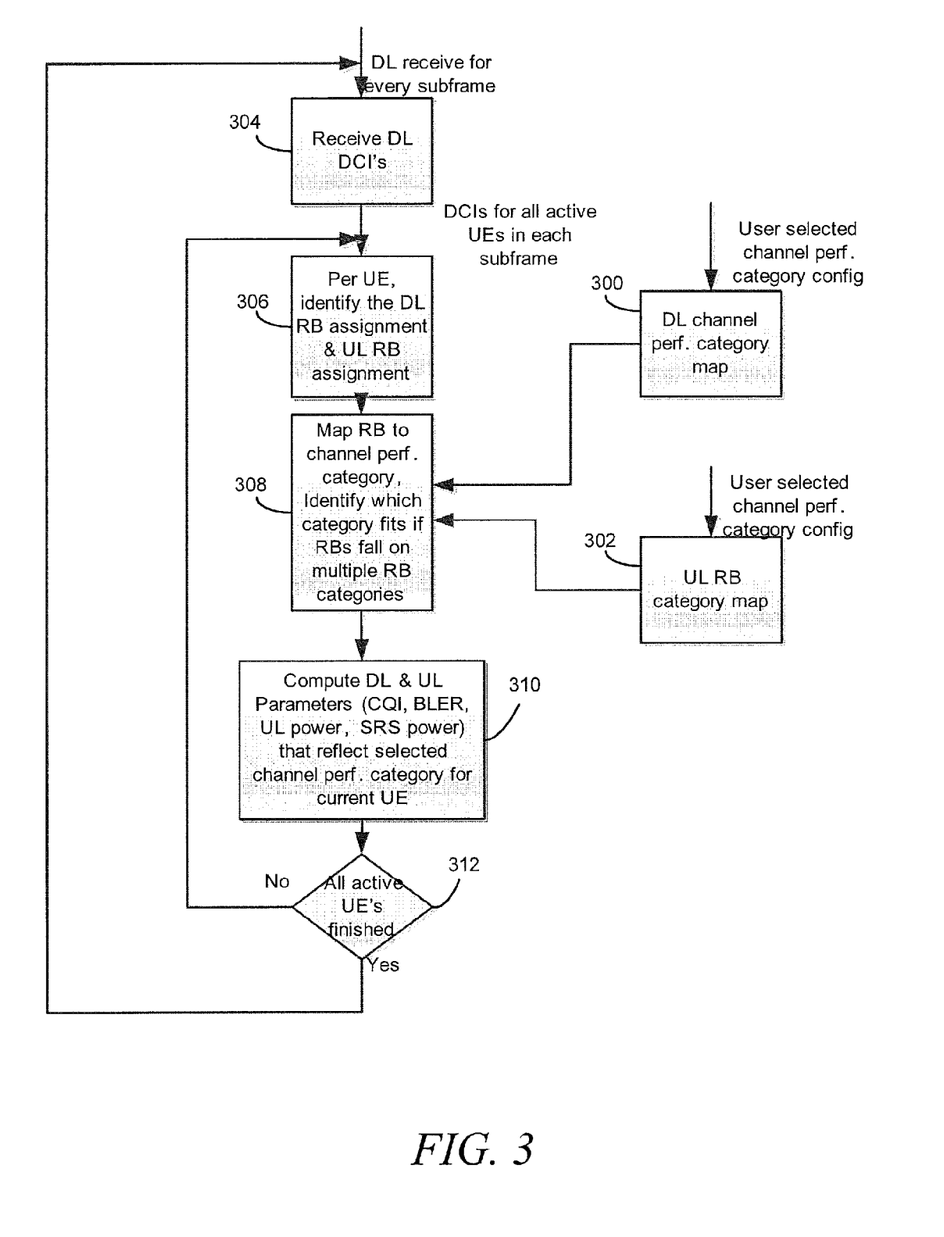
FIG. 3 is a flow chart illustrating an exemplary process for frequency selective channel modeling according to an embodiment of the subject matter described herein.

FIG. 3 is a flow chart illustrating exemplary steps that may be performed in performing frequency selective channel modeling according to an embodiment of the subject matter described herein. Referring to FIG. 3, in step 300, at configuration time, a downlink channel performance category map is configured. In this step, the user may define channel performance categories to be used during a test. The definitions may be similar to those illustrated in Table 1 above. In step 302, also performed at configuration time, the user specifies an uplink channel performance category map. The uplink resource category map may also be similar to Table 1 above, except that the specified categories are for uplink resource blocks. The mappings to channel quality parameters for each category may also be specified by the user in steps 300 and 302. Alternatively, the mappings between resource block performance categories and channel quality parameters may be hard coded so that they do not need to be specified by the user.

At run time, in step 304, downlink data is received by UE emulator 108 from the device under test 102. The downlink data includes downlink control indicator (DCI) values that specify resource block mappings to be used by the UEs being emulated. In step 306, the downlink resource block and uplink resource block assignment is identified on a per UE basis. This means that the resource blocks on the uplink and downlink channels identified used by each UE being emulated are identified. The decoding of the DCI value may be performed by UE emulator 108 or frequency selective channel modeler 112.

In step 308, each resource block is mapped to a channel performance category. The step may be performed by using data similar to that illustrated above in Table 1. If a UE uses multiple resource blocks, it may be determined which category to use. In one example, this determination may be made by selecting the category that has the largest number of resource elements assigned to the UE. The determination of a channel performance category for a resource block may be performed by frequency selective channel modeler 112 or UE emulator 108. The determination of which resource block to use in assigning a channel performance category to the UE may also be performed by frequency selective channel modeler 112 or UE emulator 108.

In step 310, uplink and downlink channel parameters are computed or determined based on the identified category. The uplink and downlink parameters may include CQI, UL power, DL BLER, and other parameters. The parameters may be determined algorithmically or using stored data such as that illustrated in Table 2. The mapping between channel performance category and channel quality parameters may be performed by frequency selective channel modeler 112 or UE emulator 108 using data provided by a frequency selective channel modeler 112.

In step 312, it is determined whether the frequency selective channel modeling has been completed for all active UEs. If channel modeling has not been completed, control returns to step 306 where the frequency selective channel modeling for the next UE begins. If channel modeling has been completed for all active UEs for the current subframe, control returns to step 304 where DCIs are received for the next subframe and the process is repeated. Thus, using the process illustrated in FIG. 3, resource block categories are used to set and/or change channel quality parameters for groups of emulated UEs.

Figure 4:
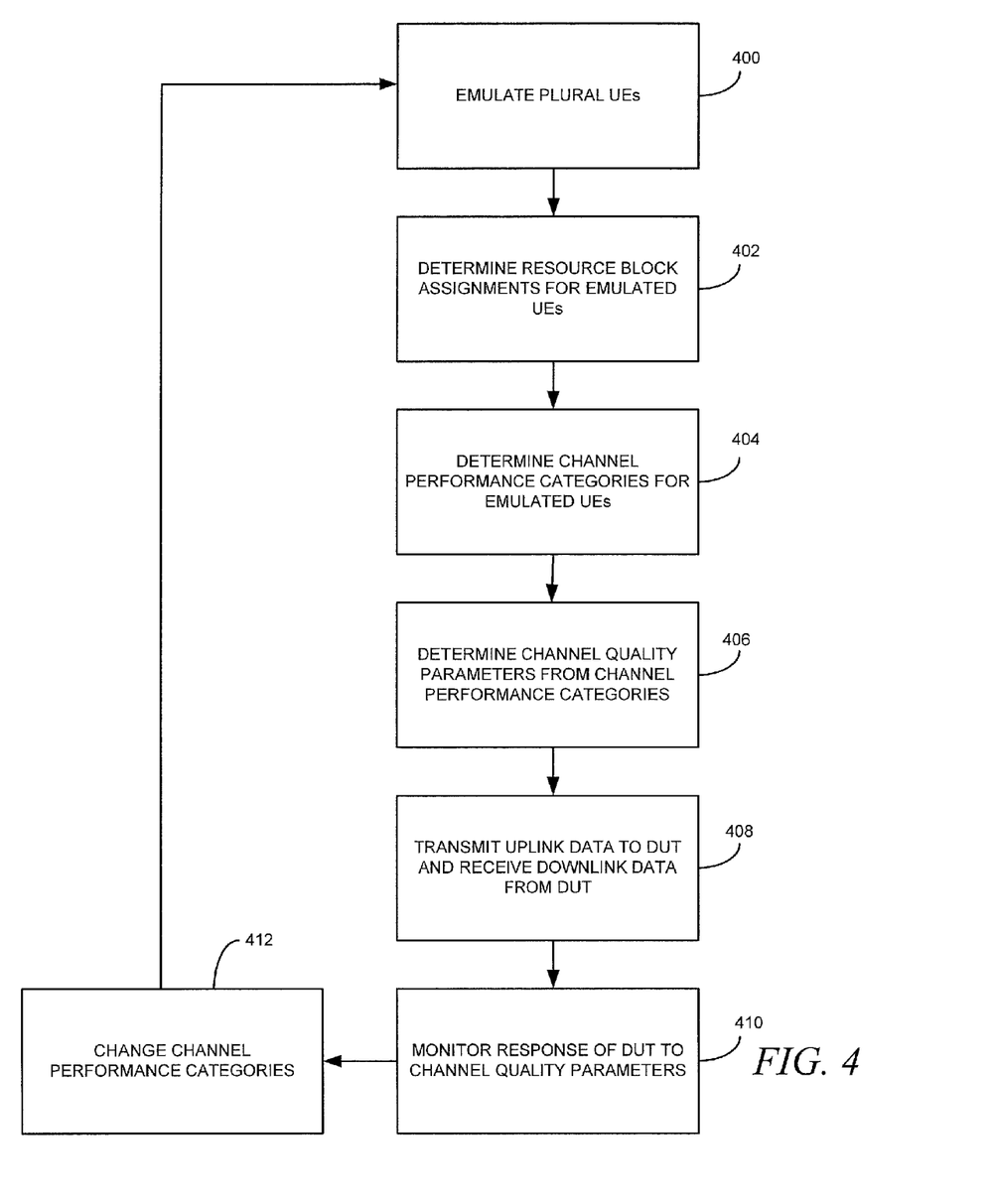
FIG. 4 is a flow chart illustrating an exemplary process for testing a network equipment test device using frequency selective channel modeling according to an embodiment of the subject matter described herein.

FIG. 4 is a flow chart illustrating an exemplary process for testing a device under test using frequency selective channel modeling according to an embodiment of the subject matter described herein. Referring to FIG. 4, in step 400, plural UEs are emulated. For example, UE emulator 108 may emulate plural LTE or LTE advanced UEs by communicating with e-Node B under test 102 over a radio interface or a wired interface used to simulate a radio interface. The communications may include UE attachment signaling, simulated media communications after attachment, and detachment signaling. In step 402, the resource block assignments for the emulated UEs are determined. For example, frequency selective channel modeler 112 may monitor downlink transmissions from the e-Node B to decode DCI values. From the DCI values, channel modeler 112 may determine uplink and downlink resource block assignments for each emulated UE.

In step 404, a channel performance category is determined for each resource block to which the emulated UEs are assigned. The categories may be the same or similar to those found above in Table 1. The determination may be made by frequency selective channel modeler 112 or by UE emulator 108 using data provided by frequency selective channel modeler 112.

In step 406, channel quality parameters are determined from the resource block performance categories. For example, CQI, BLER, and uplink power parameters can be determined based on the assigned category either algorithmically or using stored mappings. As stated above with respect to FIG. 3, the mapping between resource block performance categories and channel quality parameters may be made by frequency selective channel modeler 112 or by UE emulator 108 using data provided by frequency selective channel modeler 112.

In step 408, uplink data is transmitted to the device under test 102, and downlink data is received from the device under test 102. For example, emulated UEs 110 instantiated by UE emulator 108 may transmit uplink data to and receive downlink data from device under test 102. The uplink data may include the channel quality parameters whose values were selected using the channel performance categories described above. Each emulated UE 110 communicates its channel quality parameters to device under test 102 in the resource block or resource blocks for which the UE was scheduled by device under test 102. Because the resource blocks are assigned different performance categories, emulated UEs 110 model different channel characteristics across the entire uplink bandwidth.

In step 410, the response of the device under test 102 to changes in channel quality parameters is determined. Step 410 may be performed by test controller 114. In one example, if a particular resource block is determined to have poor quality parameters, the test device may expect the device under test 102 to migrate UEs away from the poor quality resource block. In another example, if a particular resource block is identified as having good channel quality, the test device may expect the e-Node B to migrate UEs to the good quality resource block. Whether the device under test 102 migrates the UEs as expected may be used to indicate to the user whether the e-Node B passed or failed the test.

In step 412, network equipment test device 100 may optionally change the channel performance categories for subsequent iterations of the test. For example, resource blocks that were originally assigned a high quality may be switched to low or medium quality, or vice versa. This step may be performed by test controller 114. After the channel performance parameters are changed (or not changed), control may return to step 400 where plural UEs are emulated and then to the remaining steps where the channel quality parameters of the UEs are altered based on the new channel performance categories. The steps illustrated in FIG. 4 may be repeated to see how resource block assignments change over time in response to varying channel quality.

In addition to assigning resource blocks to channel performance categories in using the channel performance categories to change channel quality parameters for emulated UEs, network equipment test device 100 may assign emulated UEs to channel models as specified by 3GPP and other standards. Examples of channel models that may be assigned to each UE include additive white Gaussian noise (AWGN), extended pedestrian A (EPA), extended typical urban (ETU), and high speed train (HST). Such channel models may be used by UE emulator 108 to further change the channel quality parameters communicated to device under test 102. Test controller 114 may monitor the response of device under test 102 to each channel model in addition to the frequency specific performance categories described above.

When testing an e-Node B that is to be deployed in an LTE or LTE advanced network, network equipment test device 100 may be used to assign the entire operating bandwidth to channel performance categories as described above. The entire operating bandwidth may be 20 megahertz for a single carrier and/or 100 megahertz for five carriers. A single resource block may be assigned to a category or a group of contiguous or noncontiguous resource blocks may be assigned to categories. The assignment of resource blocks to categories may be provided as a configuration option by network equipment test device 100 before initiating a test. In addition, channel performance category assignments may be changed either manually or automatically during a test or series of tests. The categories may be assigned to both resource blocks in uplink and downlink subframes. When simulating time division duplex (TDD) communications, the uplink and downlink channel performance category assignments may be the same. When simulating frequency division duplex (FDD) communications, the uplink and downlink channel performance categories may be the same or different from each other, as specified by the user.

By assigning resource blocks to different categories, the frequency selective scheduling functionality of the e-Node B can be tested and cell coverage holes can be identified. Such testing may facilitate the understanding of resource block performance at the subband level, which varies from cell to cell and from e-Node B to e-Node B. The subject matter described herein will help test the feature in LTE advanced networks where e-Node Bs coordinate between cells to restrict certain resource blocks so that interference will be minimized at cell edges. Using such a feature, an e-Node B may identify and block poorly performing resource blocks by UEs attached to the e-Node B so that a neighbor cell can use the resource blocks for its UEs. Thus, part of the frequency selective channel modeling described herein can be used to verify proper resource block assignment between e-Node Bs when implementing LTE advanced intercell interference avoidance functionality.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for frequency selective channel modeling to test the response of a device under test, the system comprising:
   a network equipment test device including at least one processor;
   a user equipment (UE) emulator implemented by the at least one processor and configured to emulate a plurality of UEs that attach to and communicate with a device under test; and
   a frequency selective channel modeler configured to receive resource scheduling information for the UEs from the device under test, to determine channel performance categories for the emulated UEs using the resource scheduling information and to determine values for channel quality parameters for the emulated UEs using the channel performance categories, wherein the emulated UEs communicate the channel quality parameters to the device under test.

2. The system of claim 1 wherein the frequency selective channel modeler uses stored mappings that map resource blocks to the channel performance categories, irrespective of UE assignment to resource blocks, to determine the channel performance categories for the emulated UEs.

3. The system of claim 1 wherein the frequency selective channel modeler uses stored mappings between the channel performance categories and the channel quality parameters to determine the channel quality parameters for the emulated UEs.

4. The system of claim 1 wherein the channel performance categories include good, poor, and medium performance categories on a per resource block basis.

5. The system of claim 1 wherein the channel quality parameters include at least one of: block error rate (BLER), channel quality indicator (CQI), rank indicator (RI), precoding matrix indicator (PMI), uplink (UL) power, uplink power head room (ULPHR).

6. The system of claim 5 wherein the frequency selective channel modeler assigns a low CQI value, a low UL power, and a high DL BLER to a UE assigned to a resource block categorized in a poor channel performance category.

7. The system of claim 5 wherein the frequency selective channel modeler assigns a medium CQI value, a medium UL power, and a medium DL BLER to a UE assigned to a resource block categorized in a medium channel performance category.

8. The system of claim 5 wherein the frequency selective channel modeler assigns a high CQI value, a high UL power, and a low DL BLER to a UE assigned to a resource block with a good channel performance category.

9. The system of claim 1 wherein the network equipment test device assigns at least some of the emulated UEs to a channel model, wherein the channel models include additive white Gaussian noise (AWGN), extended pedestrian A (EPA), extended typical urban (ETU), and high speed train (HST).

10. The system of claim 1 wherein the frequency selective channel modeler assigns performance categories to uplink and downlink resource blocks.

11. The system of claim 1 wherein the network equipment test device monitors resource block scheduling by the device under test in response to the channel quality parameters communicated by the emulated UEs to the device under test.

12. A method for frequency selective channel modeling to test the response of a device under test, the method comprising:
   emulating a plurality of user equipment (UEs);
   attaching the emulated UEs to a device under test;
   receiving resource scheduling information for the UEs from the device under test;
   determining channel characteristics for the emulated UEs using the resource scheduling information and channel performance categories;
   using the channel performance categories to determine values for channel quality parameters for the emulated UEs; and
   communicating the channel quality parameters from the emulated UEs to the device under test.

13. The method of claim 12 wherein determining the channel performance categories includes using stored mappings that map resource blocks to the channel performance categories irrespective of UE assignment to resource blocks.

14. The method of claim 12 wherein using the channel performance categories to determine values for the channel quality parameters includes using stored mappings between the channel performance categories and the channel quality parameters.

15. The method of claim 12 wherein the channel performance categories indicate good, low, and medium channel performance categories on a per resource block basis.

16. The method of claim 12 wherein the channel quality parameters include at least one of: block error rate (BLER), channel quality indicator (CQI), rank indicator (RI), precoding matrix indicator (PMI), uplink (UL) power, uplink head room (ULHR).

17. The method of claim 16 comprising assigning a low CQI value, a low UL power, and a high DL BLER to a UE assigned to a resource block with a low channel performance category.

18. The method of claim 16 comprising assigning a medium CQI value, a medium UL power, and a medium DL BLER to a UE assigned to a resource block with a medium channel performance category.

19. The method of claim 16 comprising assigning a high CQI value, a high UL power, and a low DL BLER to a UE assigned to a resource block with a good channel performance category.

20. The method of claim 12 comprising assigning at least some of the emulated UEs to a channel model, wherein the channel models include additive white Gaussian noise (AWGN), extended pedestrian A (EPA), extended typical urban (ETU), and high speed train (HST).

21. The method of claim 12 comprising assigning the channel performance categories to uplink and downlink resource blocks.

22. The method of claim 12 comprising monitoring resource block scheduling by the device under test to the channel quality parameters communicated by the emulated UEs to the device under test.

23. A non-transitory computer readable medium having stored thereon executable instructions that when executed by the processor of a computer control the computer to perform steps comprising:
    emulating a plurality of user equipment (UEs);
    attaching the emulated UEs to a device under test;
    receiving resource scheduling information for the UEs from the device under test;
    determining channel characteristics for the emulated UEs using the resource scheduling information and channel performance categories;
    using the channel performance categories to determine values for channel quality parameters for the emulated UEs; and
    communicating the channel quality parameters from the emulated UEs to the device under test.

* * * * *